(12) United States Patent
Azoulay et al.

(10) Patent No.: US 11,359,049 B2
(45) Date of Patent: Jun. 14, 2022

(54) GOLD CATALYZED POLYMERIZATION REACTIONS OF UNSATURATED SUBSTRATES

(71) Applicants: Jason D. Azoulay, Hattiesburg, MS (US); Joshua Tropp, Hattiesburg, MS (US); Eric King, Hattiesburg, MS (US)

(72) Inventors: Jason D. Azoulay, Hattiesburg, MS (US); Joshua Tropp, Hattiesburg, MS (US); Eric King, Hattiesburg, MS (US)

(73) Assignee: THE UNIVERSITY OF SOUTHERN MISSISSIPPI, Hattiesburg, MS (US)

(*) Notice: Subject to any disclaimer, the term of this patent is extended or adjusted under 35 U.S.C. 154(b) by 0 days.

(21) Appl. No.: 16/926,380

(22) Filed: Jul. 10, 2020

(65) Prior Publication Data

US 2020/0407489 A1 Dec. 31, 2020

Related U.S. Application Data

(63) Continuation of application No. 16/138,162, filed on Sep. 21, 2018, now Pat. No. 10,711,092.

(51) Int. Cl.
*C08G 61/10* (2006.01)
*C08G 61/02* (2006.01)
*C08G 61/12* (2006.01)

(52) U.S. Cl.
CPC ............ *C08G 61/10* (2013.01); *C08G 61/02* (2013.01); *C08G 61/126* (2013.01);
(Continued)

(58) Field of Classification Search
CPC ....... C08G 61/10; C08G 61/02; C08G 61/126
See application file for complete search history.

(56) References Cited

U.S. PATENT DOCUMENTS

| 5,510,438 A | 4/1996 | Ferraris et al. |
| 6,982,514 B1 | 1/2006 | Lu et al. |

(Continued)

FOREIGN PATENT DOCUMENTS

| JP | 2011116961 A | 6/2011 |
| JP | 2013254943 A | 12/2013 |

(Continued)

OTHER PUBLICATIONS

Zhang, et al., "BCl3-mediated polycoupling of alkynes and aldehydes: a facile, metal-free multicomponent polymerization route to construct stereoregular functional polymers," Polym. Chem., 2016, 7, 4667-4674. (Year: 2016).*

(Continued)

*Primary Examiner* — Catherine S Branch
(74) *Attorney, Agent, or Firm* — Mendelsohn Dunleavy, P.C.

(57) ABSTRACT

The present invention provides novel methods and processes for polymerizing unsaturated substrates, such as alkyne bearing monomers, with arenes. The polymerizations are catalyzed by gold (Au) catalysts/complexes and/or other cocatalysts. The invention further provides novel structurally complex polymers prepared in high yield via an intermolecular polyhydroarylation mechanism. Such resulting products comprise oligomeric and polymeric materials with novel molecular architectures and microstructures, which subsequently impart unique properties. The invention includes both the synthesis methods and processes and the resulting compounds and compositions of matter.

16 Claims, 13 Drawing Sheets

Au-1

Au-2

(52) U.S. Cl.
CPC . *C08G 2261/143* (2013.01); *C08G 2261/146* (2013.01); *C08G 2261/149* (2013.01); *C08G 2261/1412* (2013.01); *C08G 2261/1414* (2013.01); *C08G 2261/1426* (2013.01); *C08G 2261/228* (2013.01); *C08G 2261/312* (2013.01); *C08G 2261/3223* (2013.01); *C08G 2261/3328* (2013.01); *C08G 2261/3422* (2013.01); *C08G 2261/41* (2013.01)

(56) References Cited

U.S. PATENT DOCUMENTS

| | | |
|---|---|---|
| 9,127,020 B2 | 9/2015 | Hildebrandt et al. |
| 9,985,211 B2 | 5/2018 | Blouin et al. |
| 2007/0111027 A1 | 5/2007 | Chen et al. |
| 2011/0006287 A1 | 1/2011 | You et al. |
| 2013/0032791 A1 | 2/2013 | Bazan et al. |
| 2013/0092912 A1 | 4/2013 | Kou |
| 2017/0069814 A1 | 3/2017 | Bazan et al. |
| 2019/0194385 A1 | 6/2019 | Azoulay et al. |

FOREIGN PATENT DOCUMENTS

| | | |
|---|---|---|
| KR | 10-2015-0113631 A | 10/2015 |
| WO | 2007016454 A2 | 2/2007 |

OTHER PUBLICATIONS

London, Alexander E., et al. "Donor-acceptor polymers with tunable infrared photoresponse." Polymer Chemistry 8.19 (2017): 2922-2930.

Wu, Zhenghui, et al. "Temperature-Dependent Detectivity of Near-Inftared Organic Bulk Heterojunction Photodiodes" ACS Applied Materials & Interfaces 9.2 (2017): 1654-1660.

Guarino, Vincenzo, et al. "Electro-Active Polymers (EAPs): A Promising Route to Design Bio-Organic/Bioinspired Platforms with on Demand Functionalities." Polymers 8.5 Article 185 (2016): (26 pages).

Jonas, Friedrich, et al. "Conductive modifications of polymers with polypyrroles and polythiophenes." Synthetic Metals 41.3 (1991): 831-836.

Mirabedini, Azadeh, et al.. "Developments in conducting polymer fibres: from established spinning methods toward advanced applications." RSC Advances 6.50 (2016): 44687-44716.

Roncali, J. "Molecular Engineering of the Band Gap of $\pi$-Conjugated Systems: Facing Technological Applications." Macromolecular Rapid Communications 28.17 (2007): 1761-1775.

* cited by examiner

GOLD CATALYZED POLYMERIZATION REACTIONS OF UNSATURATED SUBSTRATES

CROSS-REFERENCE TO RELATED APPLICATION

This application claims priority to and the benefit of and is a continuation of U.S. patent application Ser. No. 16/138,162, filed Sep. 21, 2018, of the same title, now allowed, which claims priority to and the benefit of U.S. Provisional Patent Application Ser. No. 62/561,285, filed Sep. 21, 2017, of the same title, which applications are hereby fully incorporated in their entireties by their reference herein.

FIELD OF THE INVENTION

This invention relates to the field of polymer science and, more specifically, to novel methods and processes for polymerizing unsaturated substrates, such as alkyne bearing monomers, with arenes. Further, the invention provides polymers that are prepared in high yield via an intermolecular polyhydroarylation process, the products of which comprise oligomeric and polymeric materials having novel molecular architectures and microstructures.

SUMMARY OF THE INVENTION

The present invention provides new methods and processes for polymerizing unsaturated substrates, such as alkyne bearing monomers for example, with arenes. The polymerizations are catalyzed by gold (Au) catalysts/complexes and/or other cocatalysts. The invention provides novel structurally complex polymers prepared in high yield via an intermolecular polyhydroarylation mechanism, the products of which comprise oligomeric and polymeric materials with novel molecular architectures and microstructures, which subsequently impart unique properties.

With the foregoing and other objects, features, and advantages of the present invention that will become apparent, the nature of the invention may be more clearly understood by the following detailed description of the preferred embodiments of the invention and by the appended claims.

BACKGROUND OF THE INVENTION

Advances in synthetic methodologies have enabled the evolution of structurally complex polymers with control over size (molecular weight) and architecture (e.g. statistical, alternating, block), affording the achievement of advanced structures within very narrow limits of molecular weight and end-group fidelity. Attention has turned toward functional polymers, with an ever-increasing range of capabilities that push the limits of current approaches. Transition metal-mediated polymerizations have played a critical role in this context; however, there is an ongoing need for new reactions that yield advanced macromolecular structures with enhanced properties and performance. The ultimate viability of these approaches will also rely on atom economical transformations, insensitivity to $O_2$ and $H_2O$, high functionality tolerance, increased molecular complexity, and orthogonality to other transition metal catalyzed methodologies and polymerization protocols.

Homogenous gold (Au) complexes have emerged as excellent catalysts in numerous transformations involving the activation of unsaturated carbon-carbon (C—C) bonds towards the attack of a wide variety of nucleophiles. Relativistic effects in Au provide superior Lewis acidic behavior and preferential reactivity with "soft" species such as π-systems. Au complexes have a particularly strong affinity for alkynes and allenes, even in the presence of other functional groups, affording very selective transformations and access to highly complex molecules. These complexes can also stabilize cationic reaction intermediates formed by backdonation. The non-classical nature of these intermediates, together with a low propensity toward β-hydride elimination, frequently results in excellent reactivities and selectivities. These features coalesce to afford transformations which are not possible with other transition metals and provide a rapid increase in structural complexity starting from very simple substrates. Other advantages include reduced oxophilicity, tolerance toward $O_2$ and $H_2O$, and the use of very mild reaction conditions.

Cationic Au species are regarded as the most powerful catalysts for the electrophilic activation of alkynes/allenes/alkenes towards a wide variety of nucleophiles. Although there are many types of transformations catalyzed by homogeneous Au complexes, a majority of them proceed through very similar mechanistic steps. Firstly, a cationic Au complex acts as Lewis acid to activate C—C multiple bonds and form a $\eta^2$-complex. Simultaneously, Au can also complex with other components (solvent, nucleophiles, products, additives, etc.) in the reaction system. Slippage of Au will form a very reactive intermediate, which is eventually attacked by the nucleophile. Finally, protodeauration (addition of a proton to the site where the removal of Au takes place) regenerates cationic Au to give the final product.

Homogenous Au catalysis has received significant attention in the organic literature leading to the discovery of a remarkable amount of new, synthetically useful transformations and access to unprecedented molecular architectures. While immense progress has been made in the field, there are very few examples of homogenous Au catalysis and its relation to polymer chemistry. The full potential of gold catalysis to construct novel macromolecular architectures has not been realized and is only in its infancy. As a relevant example, homogenous Au catalysis was used to create an original macromolecular skeleton using the first ever carbene-to-olefin polymerization. Monomers incorporating both a propargylic ester and an alkene moiety were polymerized yielding novel polymers possessing an original cyclopropyl-vinylester-phenyl skeleton. The polycyclopropanation process demonstrates the only example to date of an Au-catalyzed redox neutral mechanism to access a unique macromolecular architecture.

The Au-catalyzed intermolecular hydroarylation of alkynes leads to 1,1-disubstituted alkenes. An extension of the above methodology involves the sequential reaction ("polyhydroarylation") of bifunctional or multifunctional monomers.

BRIEF DESCRIPTION OF THE DRAWINGS

The drawings, which are incorporated in and form a portion of the specification, illustrate certain claims of the invention and, together with the entire specification, are meant to explain preferred embodiments of the present invention to those skilled in the art. The drawings supplement the specification and are intended to illustrate further the invention and its advantages. The figures and drawings shown or described in this disclosure and in the Detailed Description of the Invention are as follows:

DETAILED DESCRIPTION OF THE INVENTION

Figure 1:
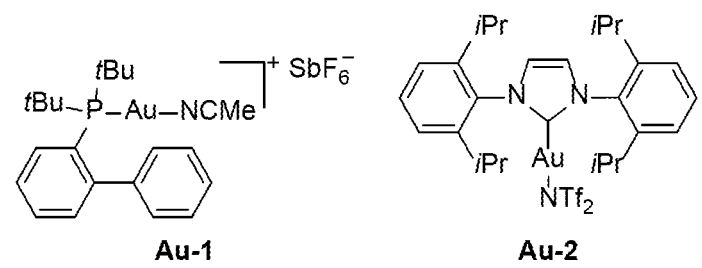
FIG. 1 shows a representation of the catalyst structures utilized in the present invention.

The present invention provides novel processes for polymerizing unsaturated substrates, for example, alkyne bearing monomers, with arenes. The invention further provides novel polymers through the sequential polyhydroarylation of multifunctional monomers.

The present invention overcomes two major long-standing issues associated with conjugated polymers: 1) Common synthetic methodologies require harsh reaction conditions, air/moisture-free conditions, and functionalization of monomers with toxic and expensive metalation procedures. The polyhydroarylation of the invention provides a facile mechanism tolerating air and water to directly couple aryl monomers to access cross-conjugated and non-conjugated polymers; and 2) Current synthetic methodologies are limited in terms of structures that can be readily synthesized from available starting materials. The polyhydroarylation of the invention provides a pathway to access novel macromolecular architectures that have potential in the areas of specialty polymers (i.e. fluorinated polymers, elastomers, for example), high performance and engineering polymers, coatings, polymers for optoelectronics and energy applications, and a wide range of other applications.

1. In one embodiment, the invention provides processes for polymerizing alkyne bearing monomers with arenes. The process comprises mixing one, or more than one, monomer with a gold (Au) catalyst or initiator, and sometimes other cocatalysts, coinitiators, or coactivators derived from silver (Ag), copper (Cu), at least one acid, or a combination thereof, for example, to produce a polymer that comprises one or more than one type of monomer. In other embodiments, the polymerization process utilizes two or more monomers, resulting in copolymerization.

"Alkyne" is intended to embrace a linear, branched, cyclic, or a combination of linear and/or branched and/or cyclic, hydrocarbon chain(s) and/or ring(s) having at least one carbon-carbon triple bond. "Alkynylene" is intended to embrace a linear, branched, cyclic, or a combination of linear and/or branched and/or cyclic, hydrocarbon chain(s) and/or ring(s) having at least one carbon-carbon triple bond.

"Arene (Ar)" is defined as an optionally substituted aromatic ring system, such as phenyl or naphthyl. Arene groups include monocyclic aromatic rings and polycyclic aromatic ring systems. In other embodiments, arene groups can be unsubstituted. In other embodiments, arene groups can be substituted.

"Heteroarene" is defined as an optionally substituted aromatic ring system where heteroatoms include, but are not limited to, oxygen, nitrogen, sulfur, selenium, phosphorus, etc. In other embodiments, heteroaryl groups can be unsubstituted.

2. In one embodiment, the invention provides polymers of the formula (I):

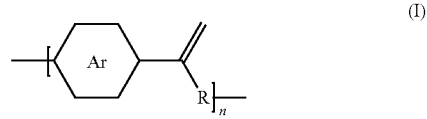

(I)

where Ar is an arene group; R is selected from the group consisting of unsubstituted hydrocarbyl, substituted hydrocarbyl, unsubstituted aryl, substituted aryl, unsubstituted heteroaryl, substituted heteroaryl, unsubstituted hydrocarbylene, hydrocarbyl, substituted hydrocarbylene, hydrocarbyl, F, Cl, Br, I, CN, $R_2$, $SR_2$, OH, $OR_2$, COOH, $COOR_2$, $NH_2$, $NHR_2$, or $NR_2R_3$, where $R_2$ and $R_3$ are independently selected from a hydrocarbyl group; R can be any functional group; and n is an integer between about 5 and about 10,000.

3. In another embodiment, the invention provides polymers of the formula (II):

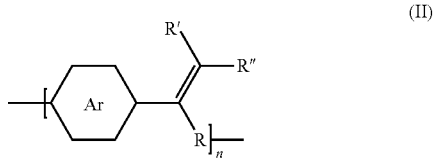

(II)

where Ar is an arene group; R, R', and R" are selected from the group consisting of unsubstituted hydrocarbyl, substituted hydrocarbyl, unsubstituted aryl, substituted aryl, unsubstituted heteroaryl, substituted heteroaryl, unsubstituted hydrocarbylene, hydrocarbyl, substituted hydrocarbylene, hydrocarbyl, F, Cl, Br, I, CN, $R_2$, $SR_2$, OH, $OR_2$, COOH, $COOR_2$, $NH_2$, $NHR_2$, or $NR_2R_3$, where $R_2$ and $R_3$ are independently selected from a hydrocarbyl group; R can be any functional group; and n is an integer between about 5 and about 10,000.

4. In another embodiment, the invention provides cross conjugated polymers of the formula (III):

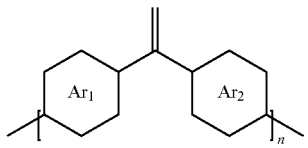

(III)

where $Ar_1$ is one arene group; $Ar_2$ is another arene group, either the same as or different from $Ar_1$; and n is an integer between about 5 and about 10,000.

Cross-conjugated molecules are molecules with three unsaturated groups, two of which although conjugated to a third unsaturated center are not conjugated to each other. Electron communication via cross conjugation has been observed and provides for molecular systems with unique optoelectronic properties of fundamental and practical importance.

5. In one embodiment, the invention provides polymers of the formula (IV):

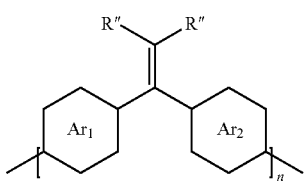

(IV)

where $Ar_1$ is one arene group; $Ar_2$ is another arene group, either the same as or different from $Ar_1$; R" is selected from the group consisting of unsubstituted hydrocarbyl, substituted hydrocarbyl, unsubstituted aryl, substituted aryl, unsubstituted heteroaryl, substituted heteroaryl, unsubstituted hydrocarbylene, hydrocarbyl, substituted hydrocarbylene, hydrocarbyl, F, Cl, Br, I, CN, $R_2$, $SR_2$, OH, $OR_2$, COOH, $COOR_2$, $NH_2$, $NHR_2$, or $NR_2R_3$, where $R_2$ and $R_3$ are independently selected from a hydrocarbyl group; and n is an integer between about 5 and about 10,000.

For Nos. (2) through (5) above (formulas I through IV), the size of the polymers can vary widely, depending on the properties desired. In some embodiments, n is an integer of at least about 10, at least about 20, at least about 50, or at least about 100. In some embodiments, n is an integer between about 5 and about 10,000, between about 10 and about 10,000, between about 10 and about 5,000, between about 10 and about 2,500, between about 10 and about 1,000, between about 10 and about 500, between about 50 and about 10,000, between about 50 and about 5,000, between about 50 and about 2,500, between about 50 and about 1,000, between about 50 and about 500, between about 100 and about 10,000, between about 100 and about 5,000, between about 100 and about 2,500, between about 100 and about 1,000, or between about 100 and about 500. Other intervals, combining any of the above numerical parameters to form a new interval, can also be used (e.g., n between about 500 and 2,500).

6. In additional embodiments, the invention provides polymer compound(s) ten (10) units long and below, i.e., oligomer(s), wherein the oligomer(s) is(are) of size n, wherein n is an integer between 1 and 10.

Some embodiments described herein are recited as "comprising" or "comprises" with respect to their various elements. In alternative embodiments, those elements can be recited with the transitional phrase "consisting essentially of" or "consists essentially of" as applied to those elements. In further alternative embodiments, those elements can be recited with the transitional phrase "consisting of" or "consists of" as applied to those elements. Thus, for example, if a composition or method is disclosed herein as comprising A and B, the alternative embodiment for that composition or method of "consisting essentially of A and B" and the alternative embodiment for that composition or method of "consisting of A and B" are also considered to have been disclosed herein. Likewise, embodiments recited as "consisting essentially of" or "consisting of" with respect to their various elements can also be recited as "comprising" as applied to those elements.

Examples

General Comments. All manipulations were performed under an inert atmosphere using standard glove box and Schlenk techniques. Reagents, unless otherwise specified, were purchased from Sigma-Aldrich and used without further purification. (Acetonitrile)[(2-biphenyl)di-tert-butylphosphine]gold(I) hexafluoroantimonate and [1,3-Bis (2,6-diisopropylphenyl)imidazol-2-ylidene] [bis (trifluoromethanesulfonyl)imide]gold(I), referred to as Au-1 and Au-2 respectively, were obtained from Strem and used as received. FIG. 1 shows the structures of Au-1 and Au-2. 1,2-dichloroethane and dichloromethane were degassed and dried over 4 Å molecular sieves. Deuterated solvents ($CDCl_3$ and $C_2D_2Cl_4$) were purchased from Cambridge Isotope Labs and used as received. $^1H$ NMR spectra were collected on a Bruker Ascend 600 MHz spectrometer and chemical shifts, δ (ppm) were referenced to the residual solvent impurity peak of the given solvent. Data reported as: s=singlet, d=doublet, t=triplet, m=multiplet, br=broad; coupling constant(s), J, are given in Hz. Microwave assisted reactions were performed in a CEM Discover microwave reactor. The peak molecular weight ($M_p$), number average molecular weight ($M_n$), weight average molecular weight ($M_w$), and dispersity (Đ) were determined by gel permeation chromatography (GPC) relative to polystyrene standards at 160° C. in 1,2,4-trichlorobenzene (stabilized with 125 ppm of BHT) in an Agilent PL-GPC 220 High Temperature GPC/SEC system using a set of four PLgel 10 μm MIXED-B columns. Polymer samples were pre-dissolved at a concentration of 1.00-2.00 mg mL$^{-1}$ in 1,2,4-trichlorobenzene with stirring for 4 h at 150° C.

Example 1. This Example Involved the Synthesis of the Polymer P1

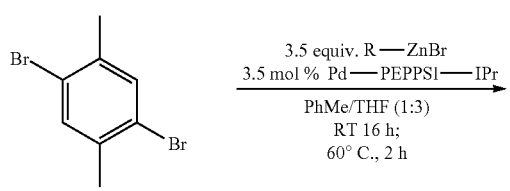

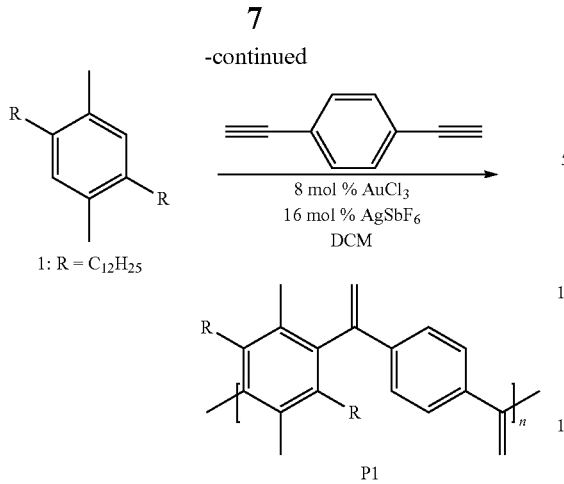

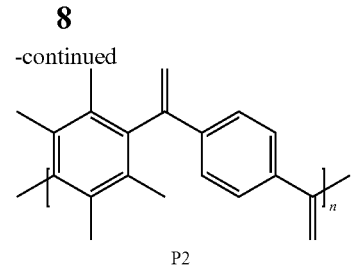

Figure 2:
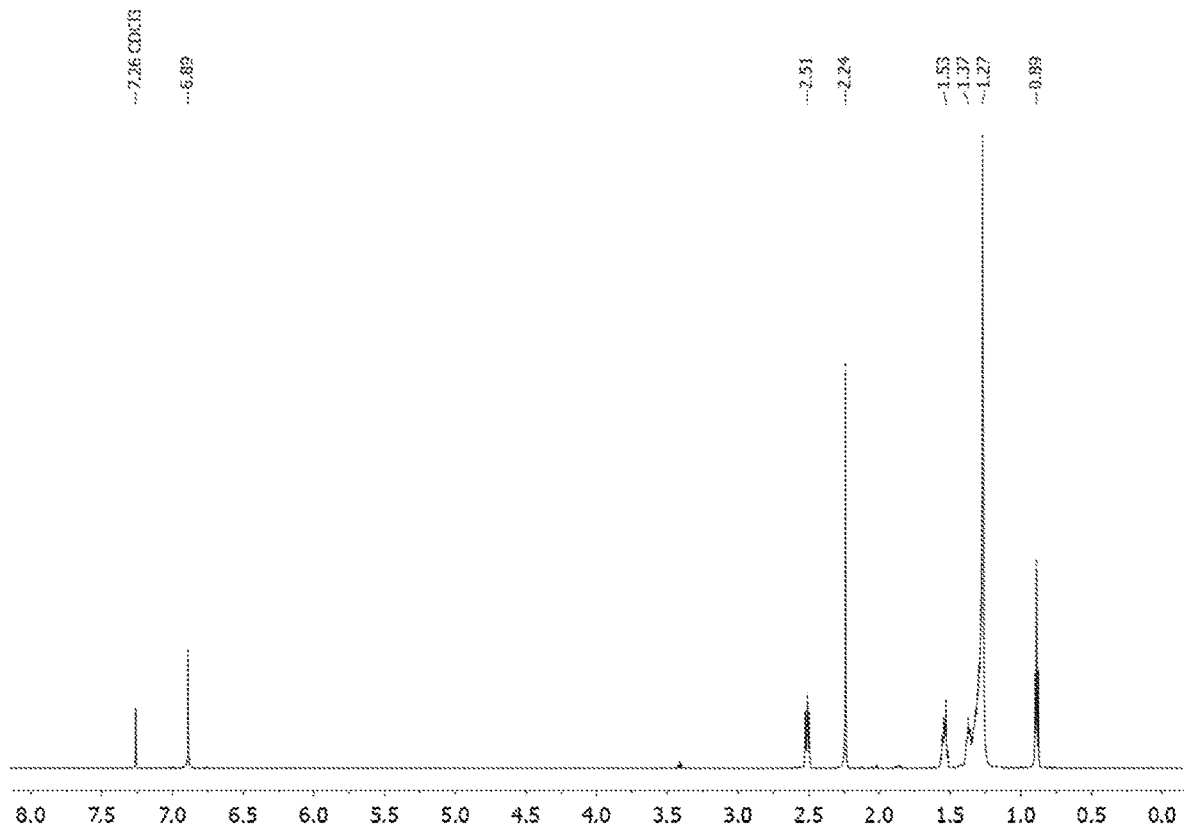
FIG. 2 shows a graphical representation of the ¹H NMR of small molecule 1 of the present invention, wherein the horizontal axis represents chemical shift (ppm), and the vertical axis represents signal intensity.

1,4-didodecyl-2,5-dimethylbenzene (1). Pd—PEPPSI—IPr (0.273 g, 3.5 mol %) and 1,4-dibromo-2,5-dimethylbenzene (3.52 g, 8.2 mmol) were added to an oven-dried flask equipped with a stir bar. Toluene (PhMe) (30 mL) was added and the reaction mixture was stirred at room temperature to dissolve the contents. A solution of n-dodecylzinc bromide (80.0 mL, 40.3 mmol) in tetrahydrofuran (THF) (0.50 M) was then added dropwise over a period of 0.5 h using a dropping funnel. After stirring for 16 h at room temperature, the reaction was heated to 60° C. and stirred at that temperature for 2 h. Upon cooling, the reaction mixture was precipitated with methanol and filtered through a Buchner funnel. The solid was then passed through a silica plug with ethyl acetate. Volatiles were removed in vacuo to afford a white crystalline solid (4.67 g, 82%). $^1$H NMR (600 MHz, CDCl$_3$) δ 6.90 (s, 2H), 2.51 (t, J=7.0, 4H), 2.24 (s, 6H), 1.54 (m, 4H), 1.40-1.20 (m, 36H), 0.89 (t, J=7.0 Hz, 6H). FIG. 2 shows the $^1$H NMR of small molecule 1.

Figure 3:
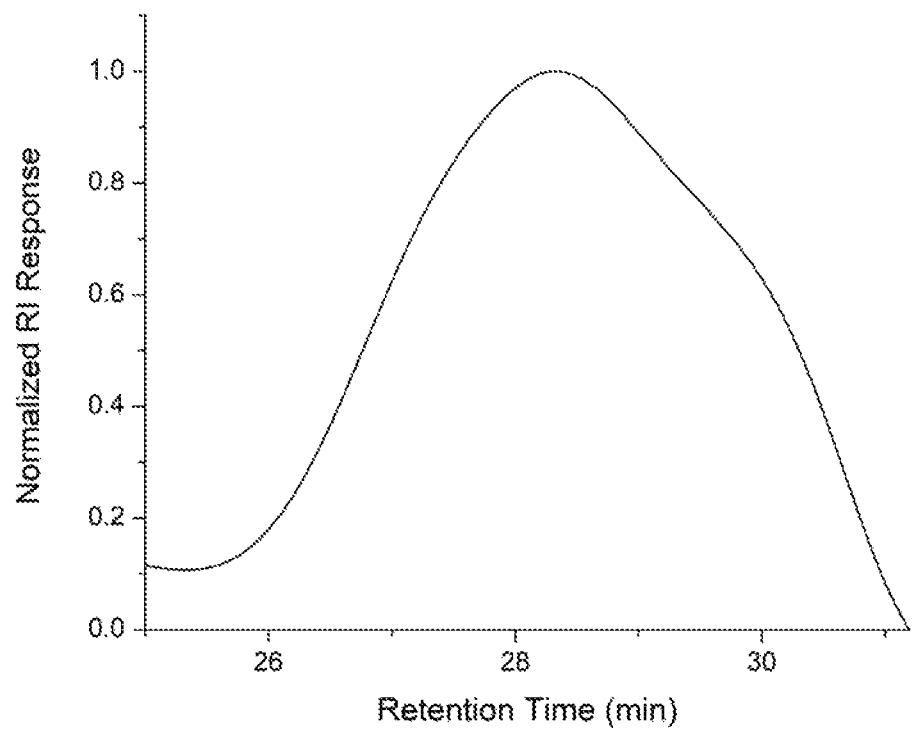
FIG. 3 shows a graphical representation of the GPC chromatogram of polymer P1 of the present invention.

Synthesis of P1. A 1 dram vial with a stir bar was loaded with 1 (0.050 g, 0.113 mmol) and 1,4-diethynylbenzene (0.014 g, 0.113 mmol) in a nitrogen filled glove box. Approximately 8 mol AuCl$_3$, 16 mol % AgSbF$_6$, and 400 μL of dichloromethane (DCM), i.e., CH$_2$Cl$_2$, were added. The vial was sealed and stirred at room temperature overnight. The mixture was precipitated into methanol and collected via filtration. The residual solid was loaded into an extraction thimble and washed successively with methanol (4 h), and acetone (4 h). The polymer was dried in vacuo to give 0.045 g (70%) of a black solid. GPC (160° C., 1,2,4-trichlorobenzene)=17.5 kg mol$^{-1}$, Mn=10.8 kg mol$^{-1}$, Mw=19.5 kg mol$^{-1}$, Đ=1.8. $^1$H NMR (600 MHz, CDCl$_3$, 313 K) δ 7.15 (s, 2H), 6.91 (s, 1H), 6.88 (s, 1H), 5.94 (br, 2H), 5.04 (br, 2H), 2.27 (s, 3H), 2.24 (s, 3H), 1.54 (m, 4H), 1.40-1.20 (m, 36H), 0.89 (t, J=6.8 Hz, 6H). FIG. 3 shows the GPC chromatogram of P1.

Example 2. This Example Involved the Synthesis of the Polymer P2

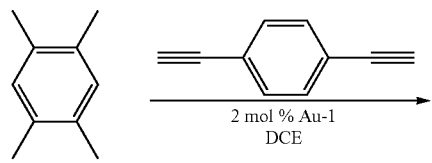

Figure 4:
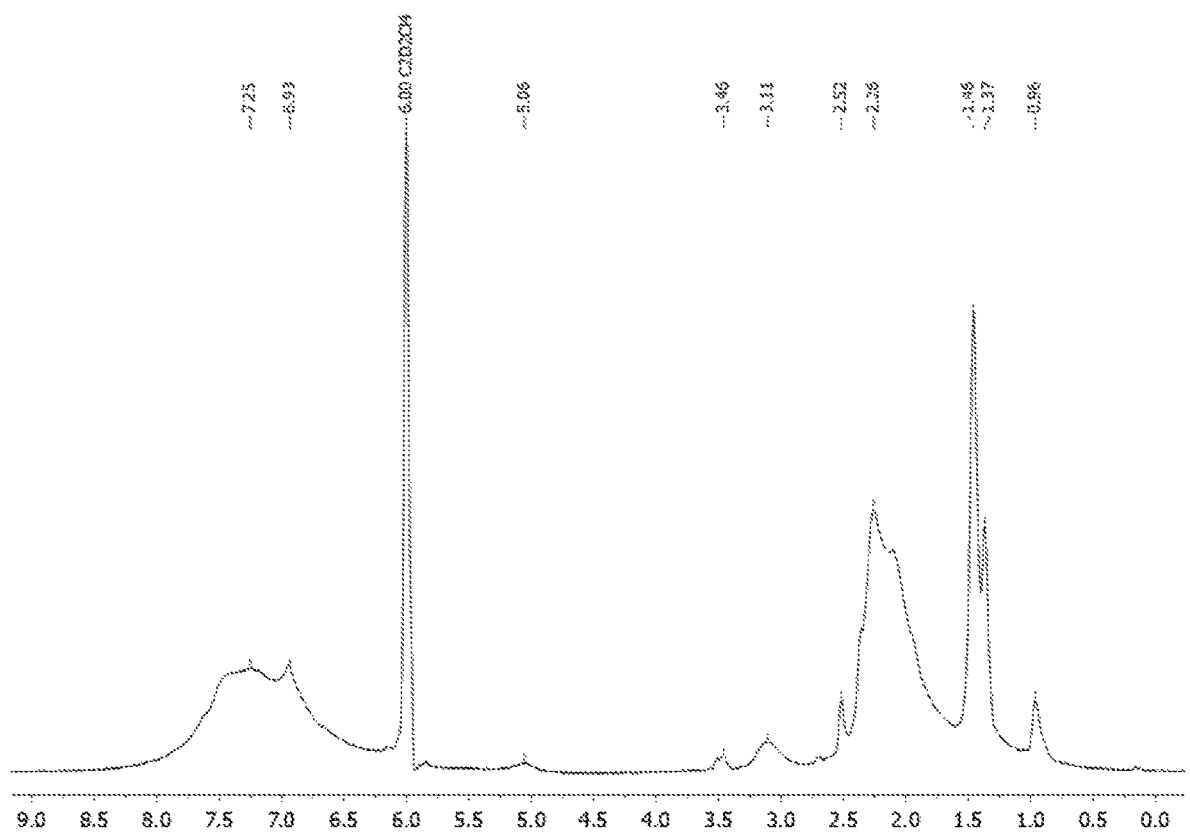
FIG. 4 shows a graphical representation of the ¹H NMR of polymer P2 of the present invention, wherein the horizontal axis represents chemical shift (ppm), and the vertical axis represents signal intensity.
Figure 5:
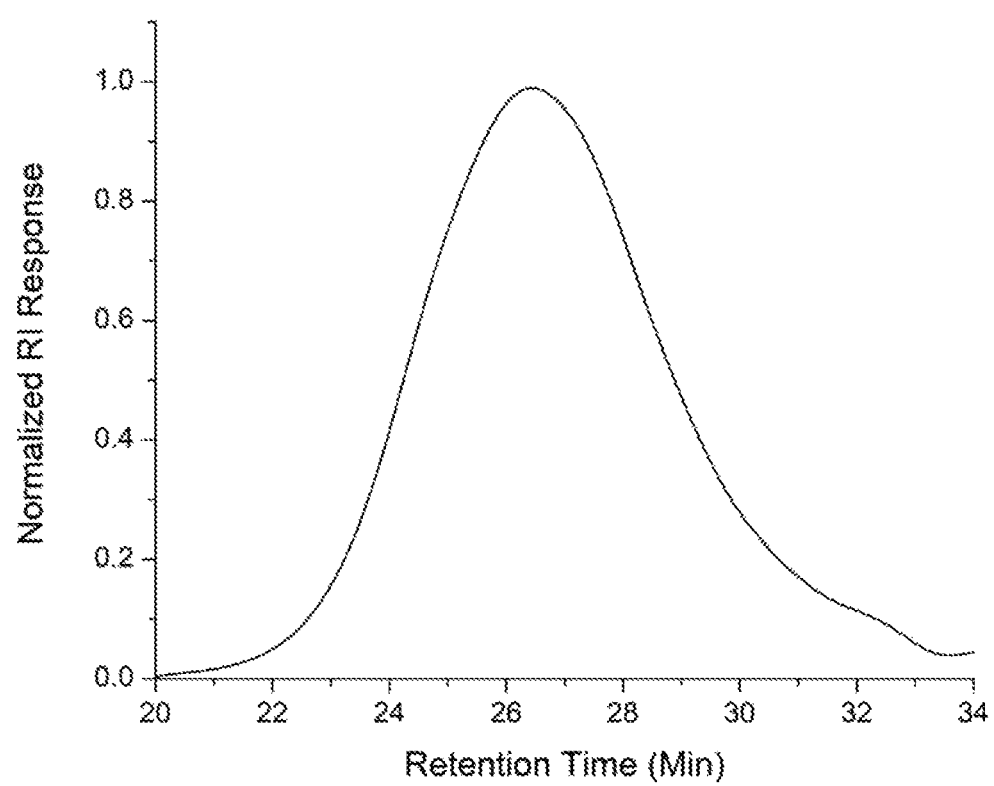
FIG. 5 shows a graphical representation of the GPC chromatogram of polymer P2 of the present invention.

Synthesis of P2. A 1 dram vial with a stir bar was loaded with 1,2,4,5-tetramethylbenzene (0.050 g, 0.373 mmol) and 1,4-diethynylbenzene (0.047 g, 0.373 mmol) in a nitrogen filled glove box. Approximately 2 mol % Au-1 and 400 μL of 1,2-dichloroethane (DCE) were added. The vial was sealed and stirred at room temperature for 6 h. The mixture was precipitated into methanol and collected via centrifugation. The residual solid was loaded into an extraction thimble and washed successively with methanol (4 h), and acetone (4 h). The polymer was dried in vacuo to give 0.039 g (40%) of a brown solid. GPC (160° C., 1,2,4-trichlorobenzene) M$_p$=23.5 kg mol$^{-1}$, M$_n$=10.0 kg mol$^{-1}$, M$_w$=47.5 kg mol$^{-1}$, Đ=4.71. $^1$H NMR (600 MHz, C$_2$D$_2$Cl$_4$, 393 K) δ 8.0-7.0 (Br, 4H), 7.0-6.3 (Br, 4H), 2.5-1 (Br, 12H). FIG. 4 shows the $^1$H NMR of P2 and FIG. 5 shows the GPC chromatogram of P2.

Example 3. This Example Involved the Synthesis of the Polymer P3

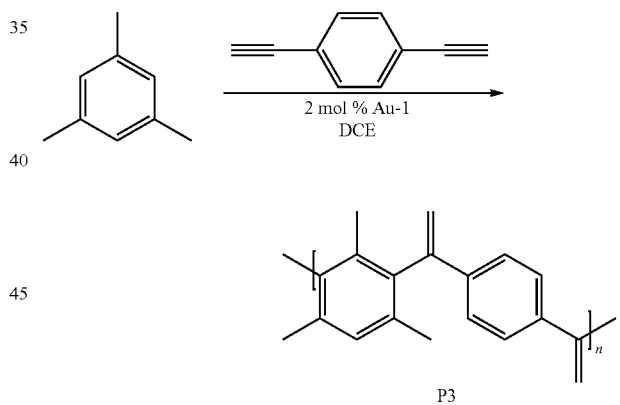

Figure 6:
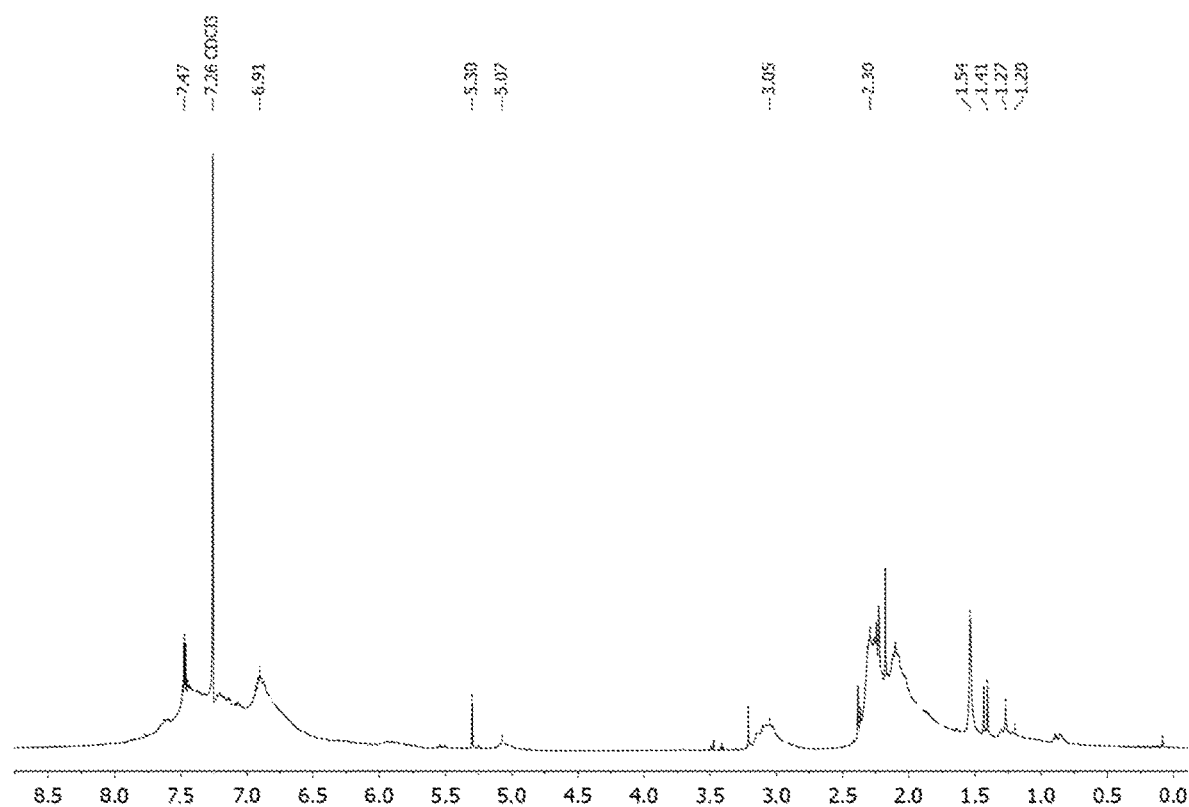
FIG. 6 shows a graphical representation of the ¹H NMR of polymer P3 of the present invention, wherein the horizontal axis represents chemical shift (ppm), and the vertical axis represents signal intensity.
Figure 7:
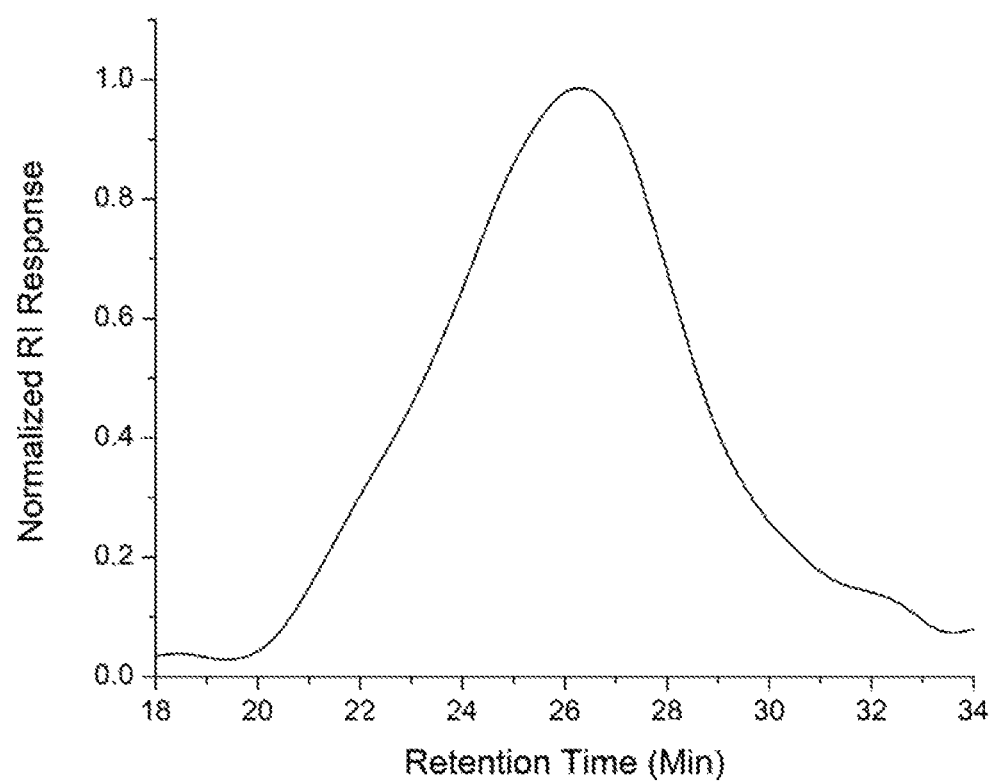
FIG. 7 shows a graphical representation of the GPC chromatogram of polymer P3 of the present invention.

Synthesis of P3. A 1 dram vial with a stir bar was loaded with 1,3,5-trimethylbenzene (0.050 g, 0.416 mmol) and 1,4-diethynylbenzene (0.052 g, 0.416 mmol) in a nitrogen filled glove box. Approximately 2 mol % Au-1 and 400 μL of 1,2-dichloroethane (DCE) were added. The vial was sealed and stirred at room temperature for 6 h. The mixture was precipitated into methanol and collected via centrifugation. The residual solid was loaded into an extraction thimble and washed successively with methanol (4 h), and acetone (4 h). The polymer was dried in vacuo to give 0.041 g (38%) of a brown solid. GPC (160° C., 1,2,4-trichlorobenzene) M$_p$=25.3 kg mol$^{-1}$, M$_n$=13.2 kg mol$^{-1}$, M$_w$=119.8 kg mol$^{-1}$, Đ=9.0. $^1$H NMR (600 MHz, CDCl$_3$ 313 K) δ 8.0-7.2 (Br, 5H), 7.2-6.3 (Br, 4H), 2.5-1.6 (Br, 9H). FIG. 6 shows the $^1$H NMR of P3 and FIG. 7 shows the GPC chromatogram of P3.

Example 4. This Example Involved the Synthesis of the Polymer P4

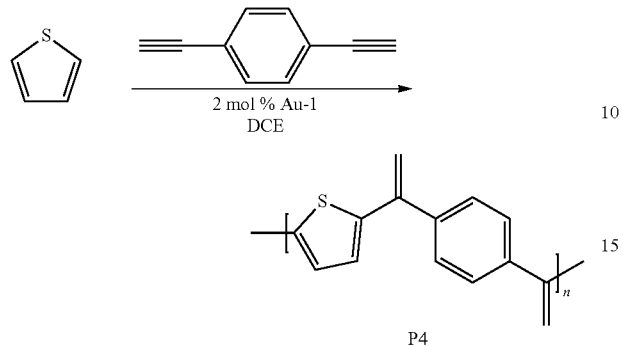

P4

Figure 8:
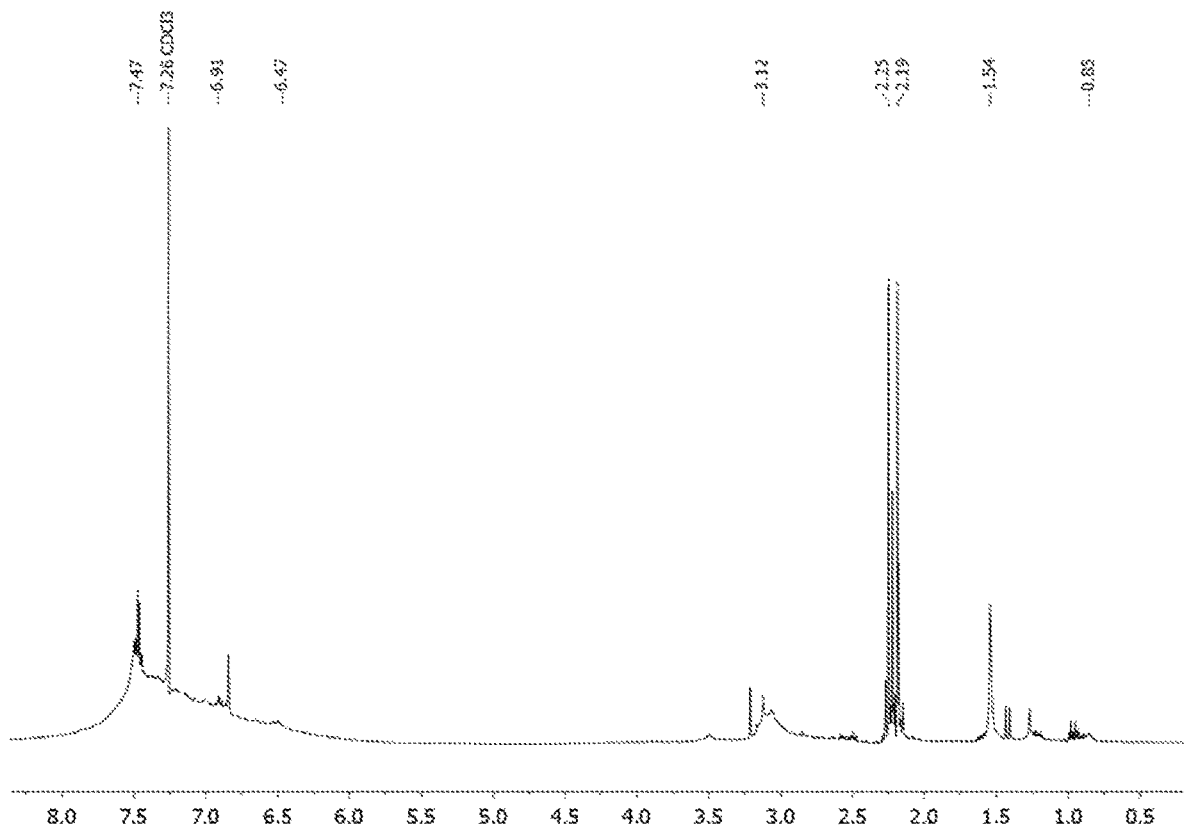
FIG. 8 shows a graphical representation of the ¹H NMR of polymer P4 of the present invention, wherein the horizontal axis represents chemical shift (ppm), and the vertical axis represents signal intensity.
Figure 9:
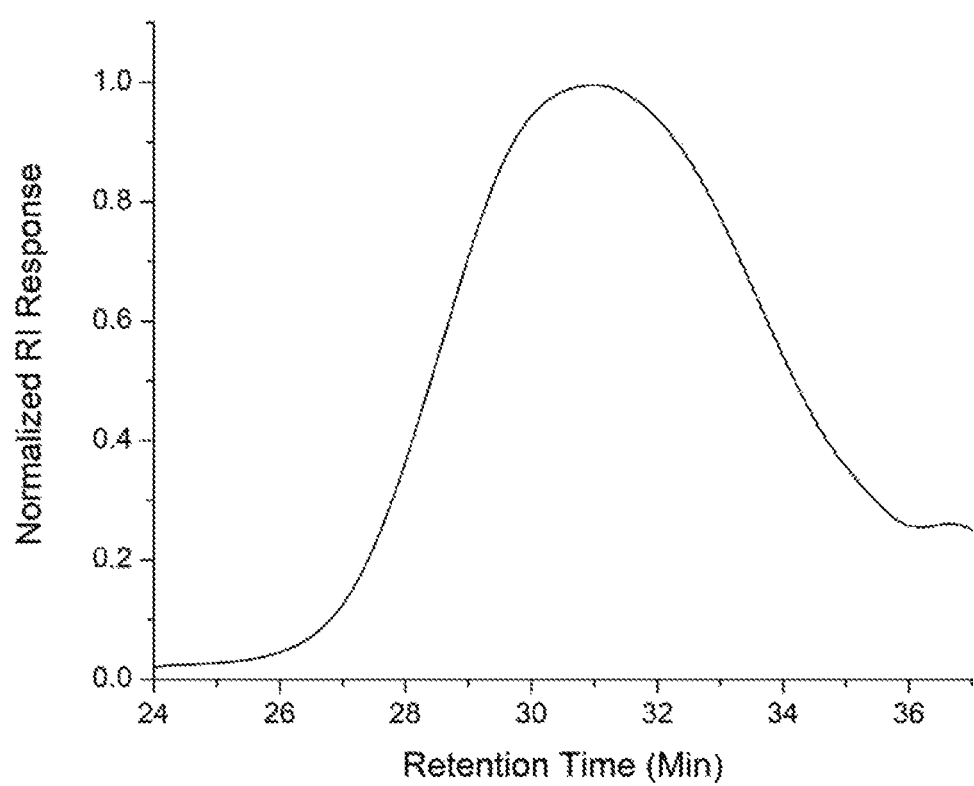
FIG. 9 shows a graphical representation of the GPC chromatogram of polymer P4 of the present invention.

Synthesis of P4. A 1 dram vial with a stir bar was loaded with thiophene (0.050 g, 0.594 mmol) and 1,4-diethynylbenzene (0.075 g, 0.594 mmol) in a nitrogen filled glove box. Approximately 2 mol % Au-1 and 400 μL of 1,2-dichloroethane (DCE) were added. The vial was sealed and stirred at room temperature for 24 h. The mixture was precipitated into methanol and collected via centrifugation. The residual solid was loaded into an extraction thimble and washed successively with methanol (4 h), and acetone (4 h). The polymer was dried in vacuo to give 0.025 g (20%) of a brown solid. GPC (160° C., 1,2,4-trichlorobenzene) $M_p$=4.5 kg mol$^{-1}$, $M_n$=1.5 kg mol$^{-1}$, $M_w$=6.9 kg mol$^{-1}$, Đ=4.5. $^1$H NMR (600 MHz, CDCl$_3$ 313 K) δ 8.0-7.5 (Br, 4H), 7.5-7.2 (Br, 2H), 7.2-6.5 (Br, 2H). FIG. 8 shows the $^1$H NMR of P4 and FIG. 9 shows the GPC chromatogram of P4.

Example 5. This Example Involved the Synthesis of the Polymer P5

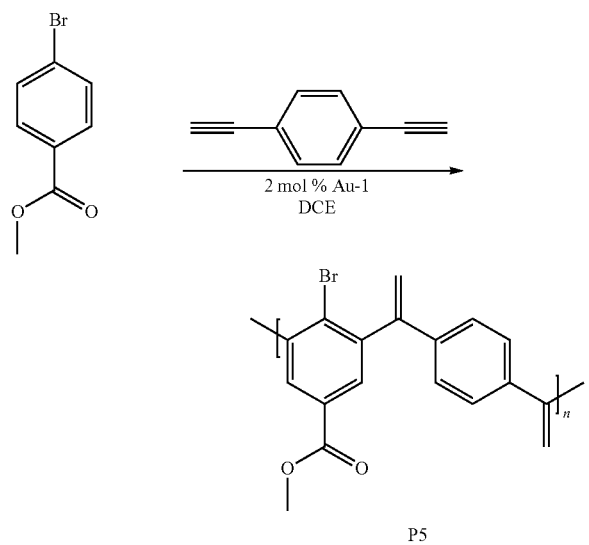

P5

Figure 10:
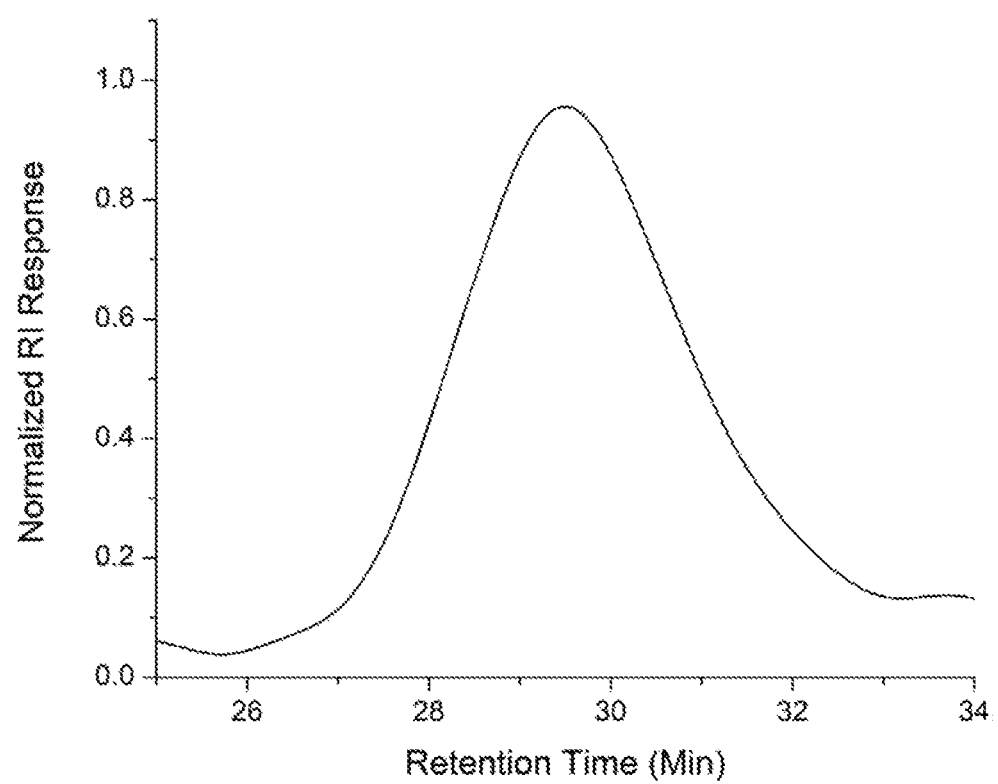
FIG. 10 shows a graphical representation of the GPC chromatogram of polymer P5 of the present invention.

Synthesis of P5. A 1 dram vial with a stir bar was loaded with methyl 4-bromobenzoate (0.050 g, 0.233 mmol) and 1,4-diethynylbenzene (0.029 g, 0.233 mmol) in a nitrogen filled glove box. Approximately 2 mol % Au-1 and 400 μL of 1,2-dichloroethane (DCE) were added. The vial was sealed and stirred at room temperature for 4 h. The mixture was precipitated into methanol and collected via centrifugation. The residual solid was loaded into an extraction thimble and washed successively with methanol (4 h), and acetone (4 h). The polymer was dried in vacuo to give 0.028 g (36%) of a brown solid. GPC (160° C., 1,2,4-trichlorobenzene) $M_p$=8.2 kg mol$^{-1}$, $M_n$=1.4 kg mol$^{-1}$, $M_w$=12.5 kg mol$^{-1}$, Đ=8.7. FIG. 10 shows the GPC chromatogram of P5.

Example 6. This Example Involved the Synthesis of the Polymer P6

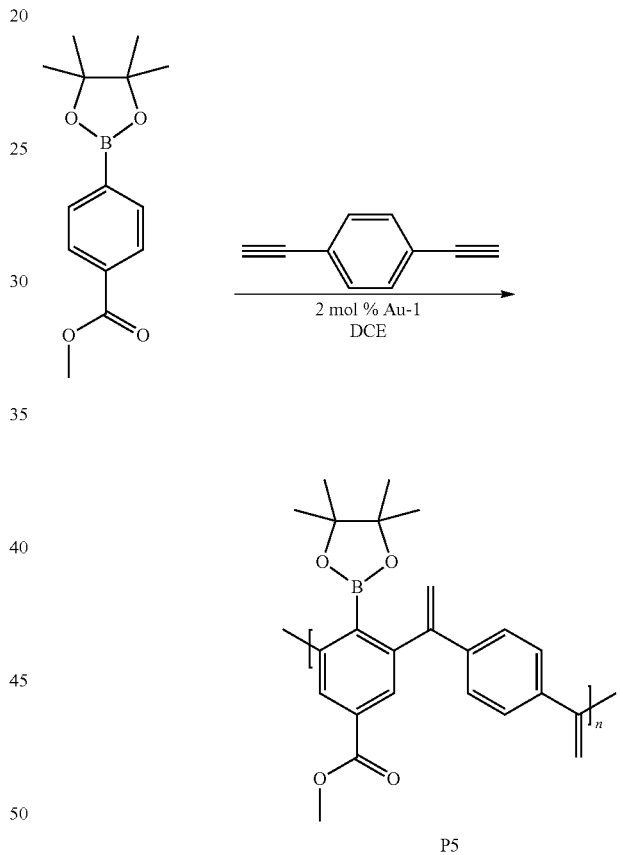

P5

Figure 11:
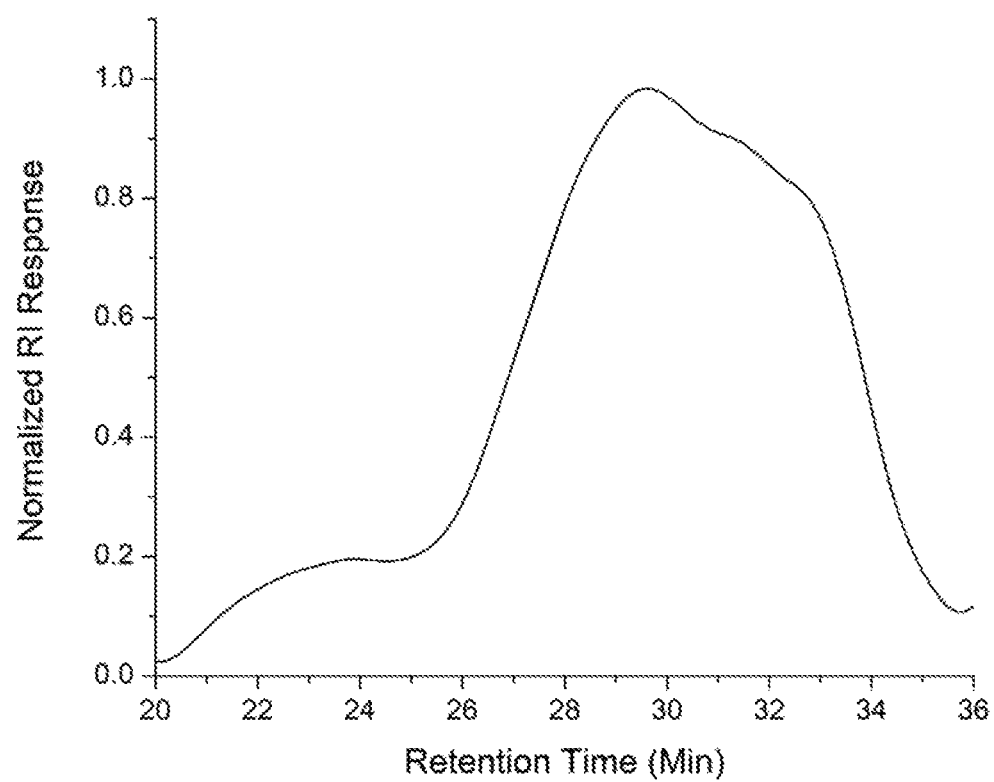
FIG. 11 shows a graphical representation of the GPC chromatogram of polymer P6 of the present invention.

Synthesis of P6. A 1 dram vial with a stir bar was loaded with methyl 4-(4,4,5,5-tetramethyl-1,3,2-dioxaborolan-2-yl)benzoate (0.050 g, 0.191 mmol) and 1,4-diethynylbenzene (0.024 g, 0.191 mmol) in a nitrogen filled glove box. Approximately 2 mol % Au-1 and 400 μL of 1,2-dichloroethane (DCE) were added. The vial was sealed and stirred at room temperature for 4 h. The mixture was precipitated into methanol and collected via centrifugation. The residual solid was loaded into an extraction thimble and washed successively with methanol (4 h), and acetone (4 h). The polymer was dried in vacuo to give 0.030 g (41%) of a brown solid. GPC (160° C., 1,2,4-trichlorobenzene) $M_p$=2.6 kg mol$^1$, Mn=2.0 kg mol$^1$, $M_w$=6.6 kg mol$^{-1}$, Đ=3.2. FIG. 11 shows the GPC chromatogram of P6.

Example 7. This Example Involved the Synthesis of the Polymer P7

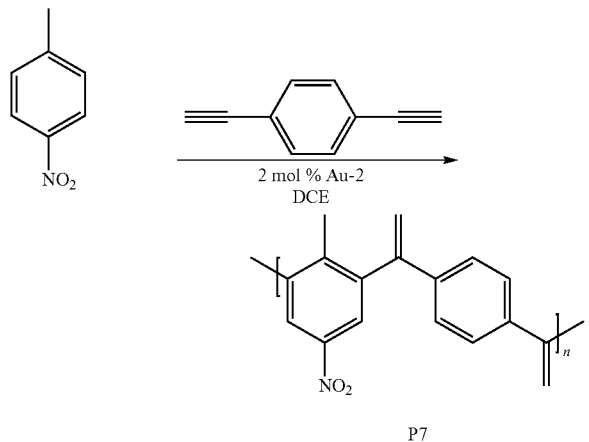

P7

Figure 12:
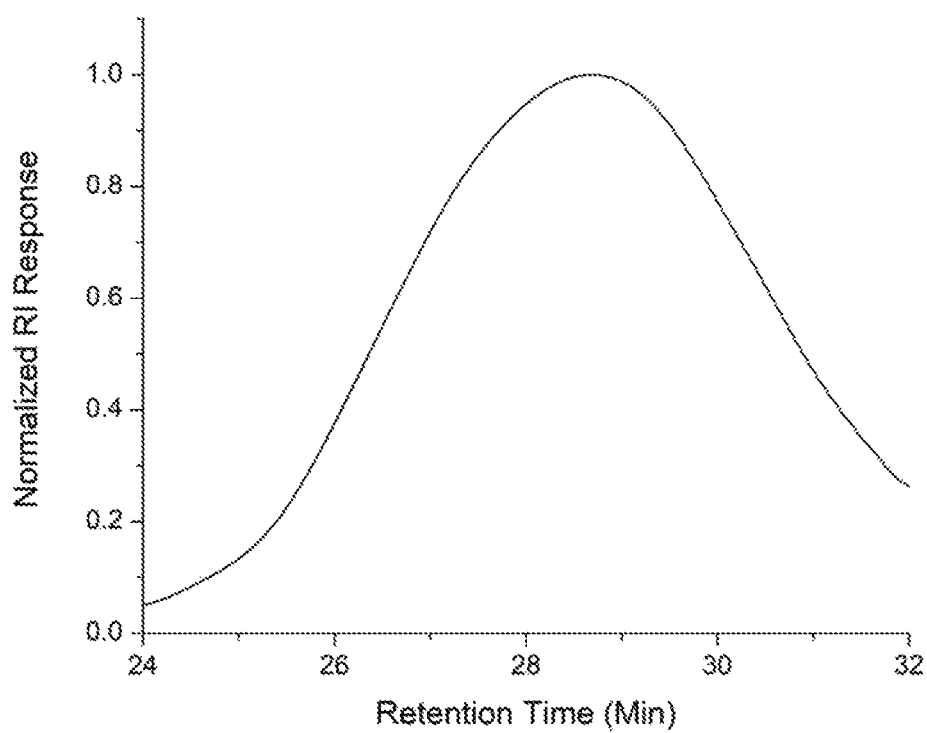
FIG. 12 shows a graphical representation of the GPC chromatogram of polymer P7 of the present invention.

Synthesis of P7. A microwave tube (10 mL) with a stir bar was loaded with 1-methyl-4-nitrobenzene (0.050 g, 0.365 mmol) and 1,4-diethynylbenzene (0.046 g, 0.365 mmol) in a nitrogen filled glove box. Approximately 2 mol Au-2 and 400 µL of 1,2-dichloroethane (DCE) were added. The tube was sealed and heated at 110° C. for 20 min in a microwave reactor. The mixture was precipitated into methanol and collected via centrifugation. The residual solid was loaded into an extraction thimble and washed successively with methanol (4 h), and acetone (4 h). The polymer was dried in vacuo to give 0.034 g (35%) of a brown solid. GPC (160° C., 1,2,4-trichlorobenzene) $M_p$=7.4 kg mol$^{-1}$, $M_n$=4.5 kg mol$^{-1}$, $M_w$=8.0 kg mol$^{-1}$, Đ=1.8. FIG. 12 shows the GPC chromatogram of P7.

Example 8. This Example Involved the Synthesis of the Polymer P8

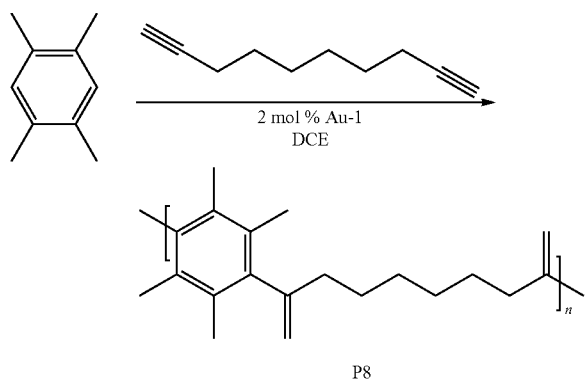

P8

Figure 13:
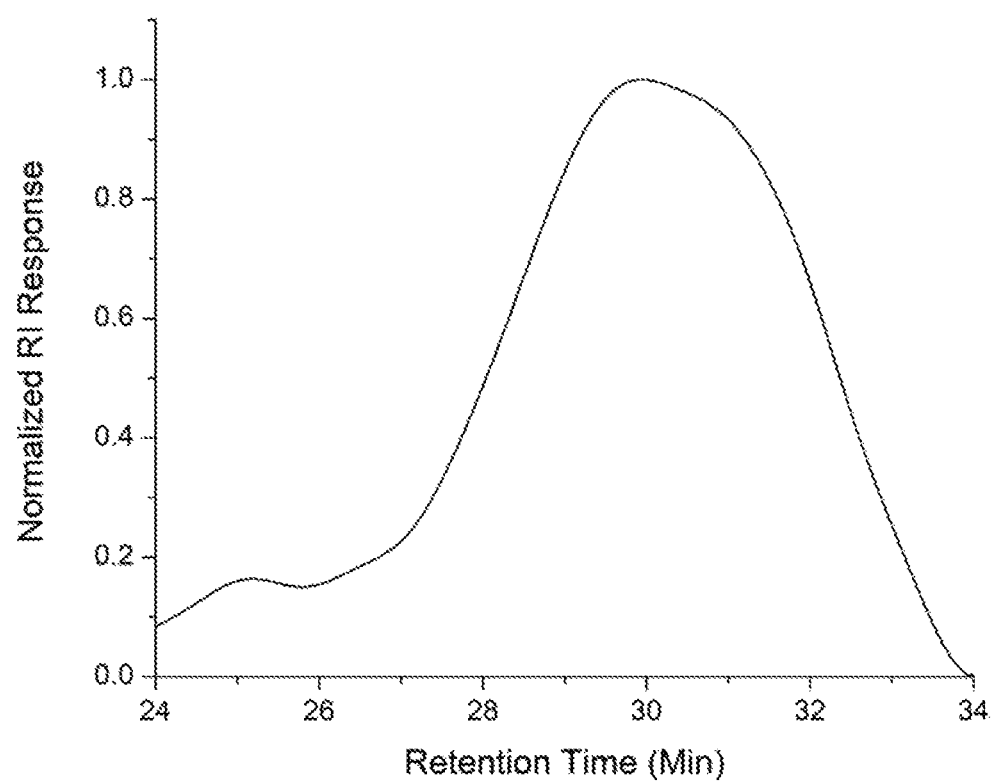
FIG. 13 shows a graphical representation of the GPC chromatogram of polymer P8 of the present invention.

Synthesis of P8. A microwave tube (10 mL) with a stir bar was loaded with 1,2,4,5-tetramethylbenzene (0.050 g, 0.373 mmol) and deca-1,9-diyne (0.050 g, 0.375 mmol) in a nitrogen filled glove box. Approximately 2 mol % Au-1 and 400 µL of 1,2-dichloroethane (DCE) were added. The tube was sealed and heated at 110° C. for 20 min in a microwave reactor. The mixture was precipitated into methanol and collected via centrifugation. The residual solid was loaded into an extraction thimble and washed successively with methanol (4 h), and acetone (4 h). The polymer was dried in vacuo to give 0.047 g (46%) of a waxy brown solid. GPC (160° C., 1,2,4-trichlorobenzene) $M_p$=7.7 kg mol$^{-1}$, $M_n$=4.3 kg mol$^{-1}$, $M_w$=21.7 kg mol$^{-1}$, Đ=5.0. $^1$H NMR FIG. 13 shows the GPC chromatogram of P8.

All parameters presented herein including, but not limited to, temperatures, pressures, volumes, dimensions, times, sizes, amounts, quantities, ratios, weights, and/or percentages, and the like, for example, represent approximate values. Further, references to 'a' or 'an' concerning any particular item, component, material, or product is defined as at least one and could be more than one.

The above detailed description is presented to enable any person skilled in the art to make and use the invention. Specific details have been revealed to provide a comprehensive understanding of the present invention and are used for explanation of the information provided. These specific details, however, are not required to practice the invention, as is apparent to one skilled in the art. Descriptions of specific applications, analyses, configurations, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

The compositions, processes, compounds, products, configurations, systems, and methods of the present invention are often best practiced by empirically determining the appropriate values of the operating parameters, or by conducting simulations to arrive at best design for a given application. Accordingly, all suitable modifications, combinations, and equivalents should be considered as falling within the spirit and scope of the invention.

REFERENCES

Brenzovich, W. E.; Benitez, D.; Lackner, A. D.; Shunatona, H. P.; Tkatchouk, E.; Goddard, W. A.; Toste, F. D.; Gold-Catalyzed Intramolecular Aminoarylation of Alkenes: C—C Bond Formation through Bimolecular Reductive Elimination**. *Angew. Chem. Int. Ed.* 2010, 49, 5519-5522.

Fukuda, Utimoto, K.; Effective Transformation of Unactivated Alkynes into Ketones or Acetals with a Gold(III) Catalyst. *J. Org. Chem,* 1991, 56 (11), 3729-3731.

Gorin, D. J.; Sherry, B. D.; Toste, F. D.; *Chem. Rev.,* 2008, 108, 3351-3378.

Gorin, D. J.; Toste, F. D. Relativistic Effects in Homogenous Gold Catalysis. *Nature,* 2007, 446, 395-403.

Hashmi, S. K.; Gold-Catalyzed Organic Reactions. *Chem. Rev.* 2007, 107, 3180-3211.

Hashmi, S. K.; Pflasterer, D.; Gold catalysis in total synthesis—recent achievements. *Chem. Soc Rev.* 2016, 45, 1331-1367.
Hashmi, S. K.; Rudolph, M.; Gold Catalysis in total synthesis. *Chem. Soc. Rev.* 2008, 37, 1766-1775.
Hashmi, S. K.; Rudolph, M.; Gold Catalysis in total synthesis—an update. *Chem. Soc. Rev.* 2012, 41, 2448-2462.
Joost, M.; Amgoune, A.; Bourissou. D.; Reactivity of Gold Complexes towards Elementary Organometallic Reactions. *Angew. Chem. Jut. Ed.* 2015, 54, 15022-1504.
Melhado, A. D.; Brenzovich, W. E.; Lackner, A. D.; Toste, F. D.; Gold-Catalyzed Three-Component Coupling: Oxidative Oxyarylation of Alkenes. *J. Am. Chem. Soc.* 2010, 132, 8885-8887.
Schmidbaur, H., *Naturwiss. Rundsch.* 1995, 48, 443.
Teles, J. H/; Brode, S.; Chabanas, M. Cationic Gold (I) Complexes: Highly Efficient Catalysts for the Addition of Alcohols to Alkynes. *Angew. Chem, Int. Ed.* 1998, 37, 1415-1418.
Teles, J. H.; Oxidative Addition to Gold(I): A New Avenue in Homogenous Catalysis with Au. *Angew. Chem. Int. Ed.* 2015, 54, 5556-5558.
Tkatchouk, E.; Mankad, N. P.; Benitez, D.; Goddard, W. A.; Toste, F. D.; Two Metals Are Better Than One in Gold Catalyzed Oxidative Heteroarylation of Alkenes. *J. Am. Chem. Soc.* 2011, 133, 14293-14300.
Wang, Z. J.; Benitez, D.; Tkatchouk, E.; Goddard, W. A.; Toste, F. D.; Mechanistic Study of Gold(I)-Catalyzed Intermolecular Hydroamination of Allenes. *J. Am. Chem. Soc.* 2010, 132, 13064-13071.
Wegner, H. A.; Auzias, M.; Gold for C—C Coupling Reactions: A Swiss-Army-Knife Catalyst? *Angew. Chem. Int. Ed.* 2011, 50.8236-8247.
Wu, C. Y.; Horibe, T.; Jacobsen, C. B.; Toste, F. D.; Stable gold(III) catalysts by oxidative addition of a carbon-carbon bond. *Nature*, 2015, 517, 449-454.
Zhang, G.; Luo, Y.; Wang, Y.; Zhang. L.; *Angew. Chem., Int. Ed.* 2011, 50, 4450.
Zhang, G. Z.; Cui, L.; Wang, Y. Z.; Zhang, L. M.; *J. Am. Chem. Soc.* 2010, 132, 1474-1475.
Zhang, G. Z.; Peng, Y.; Cui, L.; Zhang, L. M.; *Angew. Chem. Int. Ed.* 2009, 48, 3112-3115.

What is claimed is:

1. A polymer having the structure:

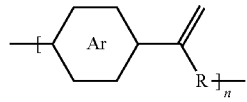

where Ar is an arene group; R is selected from the group consisting of unsubstituted arylene, substituted arylene, unsubstituted heteroarylene, substituted heteroarylene, unsubstituted hydrocarbylene, substituted hydrocarbylene, $R_2$, $SR_2$, $OR_2$, $COOR_2$, $NHR_2$, and $NR_2R_3$, where $R_2$ is a hydrocarbylene group and $R_3$ is a hydrocarbyl group; and n is an integer between about 5 and about 10,000.

2. A polymer having the structure:

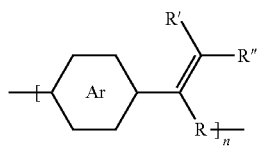

where Ar is an arene group; R is selected from the group consisting of unsubstituted arylene, substituted arylene, unsubstituted heteroarylene, substituted heteroarylene, unsubstituted hydrocarbylene, substituted hydrocarbylene, $R_2$, $SR_2$, $OR_2$, $COOR_2$, $NHR_2$, and $NR_2R_3$, where $R_2$ is a hydrocarbylene group and $R_3$ is a hydrocarbyl group; R' and R" are selected from the group consisting of unsubstituted hydrocarbyl, substituted hydrocarbyl, unsubstituted aryl, substituted aryl, unsubstituted heteroaryl, substituted heteroaryl, F, Cl, Br, I, CN, $R_2$, $SR_2$, OH, $OR_2$, COOH, $COOR_2$, $NH_2$, $NHR_2$, and $NR_2R_3$, where $R_2$ and $R_3$ are independently selected from a hydrocarbyl group; and n is an integer between about 5 and about 10,000.

3. A cross conjugated polymer having the structure:

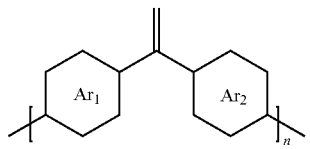

where $Ar_1$ is one arene group; $Ar_2$ is another arene group, either the same as or different from $Ar_1$, and n is an integer between about 5 and about 10,000.

4. A polymer having the structure:

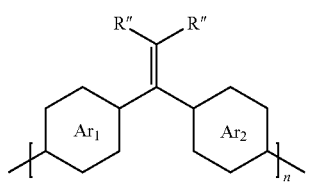

where $Ar_1$ is one arene group; $Ar_2$ is another arene group, either the same as or different from $Ar_1$. R" is selected from the group consisting of unsubstituted hydrocarbyl, substituted hydrocarbyl, unsubstituted aryl, substituted aryl, unsubstituted heteroaryl, substituted heteroaryl, F, Cl, Br, I, CN, $R_2$, $SR_2$, OH, $OR_2$, COOH, $COOR_2$, $NH_2$, $NHR_2$, and $NR_2R_3$, where $R_2$ and $R_3$ are independently selected from a hydrocarbyl group; and where n is an integer between about 5 and about 10,000.

5. A polymer having a structure selected from the group consisting of structures of the formulae P1, P2, P3, P4, P5, P6 and P7, in which n is an integer between about 5 and about 10,000:

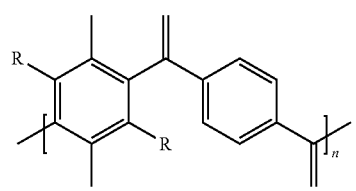

P1 wherein each R is independently selected from the group consisting of unsubstituted hydrocarbyl, substituted hydrocarbyl, unsubstituted aryl, substituted aryl, unsubstituted heteroaryl, substituted heteroaryl, F, Cl, Br, I, CN, R$_2$, SR$_2$, OH, OR$_2$, COOH, COOR$_2$, NH$_2$, NHR$_2$, and NR$_2$R$_3$, where R$_2$ and R$_3$ are independently selected from a hydrocarbyl group;

P2
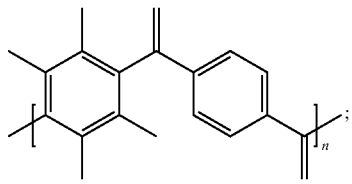

P3
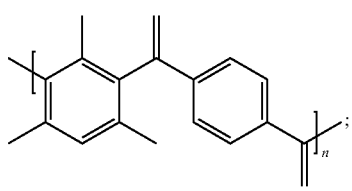

P4
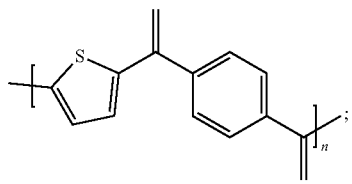

P5
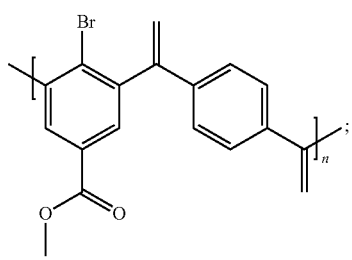

P6
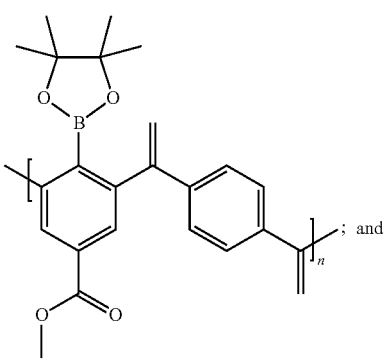
; and

P7
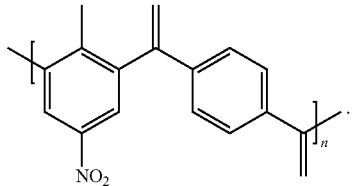

6. The polymer of claim 5, wherein the polymer has the formula:

P1
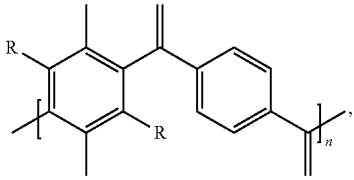

wherein each R is independently selected from the group consisting of unsubstituted hydrocarbyl, substituted hydrocarbyl, unsubstituted aryl, substituted aryl, unsubstituted heteroaryl, substituted heteroaryl, F, Cl, Br, I, CN, R$_2$, SR$_2$, OH, OR$_2$, COOH, COOR$_2$, NH$_2$, NHR$_2$, and NR$_2$R$_3$, where R$_2$ and R$_3$ are independently selected from a hydrocarbyl group, and n is an integer between about 5 and about 10,000.

7. The polymer of claim 5, wherein the polymer has the formula:

P2
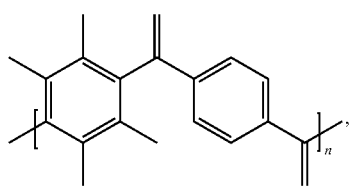

wherein n is an integer between about 5 and about 10,000.

8. The polymer of claim 5, wherein the polymer has the formula:

P3
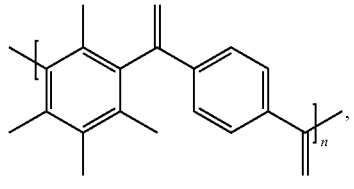

wherein n is an integer between about 5 and about 10,000.

9. The polymer of claim 5, wherein the polymer has the formula:

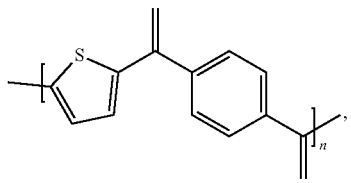

P4 wherein n is an integer between about 5 and about 10,000.

10. The polymer of claim 5, wherein the polymer has the formula:

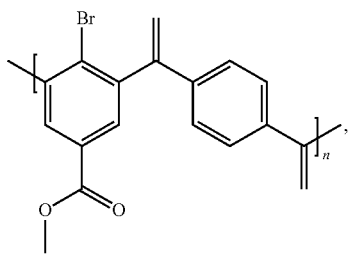

P5 wherein n is an integer between about 5 and about 10,000.

11. The polymer of claim 5, wherein the polymer has the formula:

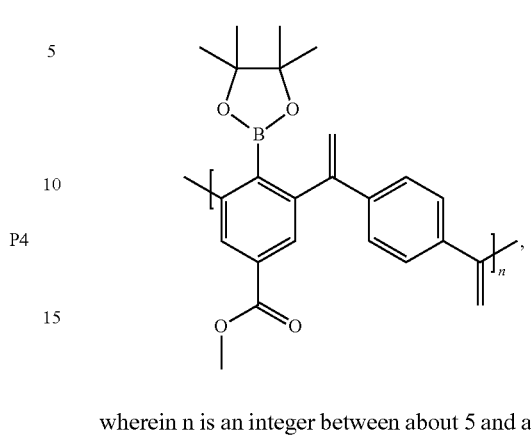

P6 wherein n is an integer between about 5 and about 10,000.

12. The polymer of claim 5, wherein the polymer has the formula:

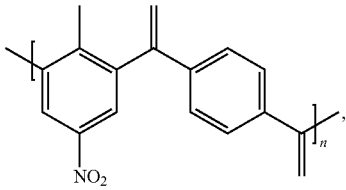

wherein n is an integer between about 5 and about 10,000.

13. The polymer of claim 1, wherein R is selected from the group consisting of unsubstituted hydrocarbylene, substituted hydrocarbylene, $R_2$, $SR_2$, $OR_2$, $COOR_2$, $NHR_2$, and $NR_2R_3$.

14. The polymer of claim 2, wherein R is selected from the group consisting of unsubstituted hydrocarbylene, substituted hydrocarbylene, $R_2$, $SR_2$, $OR_2$, $COOR_2$, $NHR_2$, and $NR_2R_3$.

15. The polymer of claim 1, wherein R is selected from the group consisting of unsubstituted hydrocarbylene and substituted hydrocarbylene.

16. The polymer of claim 2, wherein R is selected from the group consisting of unsubstituted hydrocarbylene and substituted hydrocarbylene.

* * * * *